United States Patent Office

Re. 26,903
Reissued June 9, 1970

26,903

ALLOY STEEL CONTAINING CHROMIUM, NICKEL AND MANGANESE

Paul A. Jennings, Baldwin, Md., assignor to Armco Steel Corporation, Middletown, Ohio, a corporation of Ohio No Drawing. Original No. 3,235,378, dated Feb. 15, 1966, Ser. No. 323,591, Nov. 14, 1963, which is a continuation-in-part of application Ser. No. 68,627, Nov. 14, 1960. Application for reissue May 2, 1968, Ser. No. 736,234

Int. Cl. C22c *39/20*

U.S. Cl. 75—128 9 Claims

Matter enclosed in heavy brackets [ ] appears in the original patent but forms no part of this reissue specification; matter printed in italics indicates the additions made by reissue.

*ABSTRACT OF THE DISCLOSURE*

*Alloy steel which is fully austenitic and substantially free of delta-ferrite in the annealed condition as well as the cold-worked condition, which is possessed of a combination of good hot-rolling, good cold-rolling, good welding and good scaling resistance properties, which steel essentially consists of about 8% to 16% manganese, 17.0% to 23% chromium, 5.5% to 9.5% nickel, .20% to .40% nitrogen, carbon not exceeding .05%, and remainder essentially iron. The alloy steel is made available in the form of hot-rolled sheet and strip, cold-rolled sheet and strip, and wire. The alloy steel is suited to the production of a host of articles of ultimate use, including internal combustion engine components for handling exhaust gases. For such devices the silicon content of the alloy should not exceed .25%.*

My application for patent is a continuation-in-part of my copending application, Serial No. 68,627, filed November 14, 1960, now abandoned, and entitled, Alloy Steel and Articles. The invention relates to alloy steels suited to low temperature, room temperature and elevated temperature applications, and to various particular products and articles of ultimate use fashioned thereof.

One of the objects of my invention is the provision of an alloy steel which is readily hot-rolled at the mill into sheet and strip, as well as rods and wire, and which sheet, strip, rods and wire readily lend themselves to further reduction by cold-rolling for the sheet and strip and cold-drawing for the rods and wire, and to pressing, bending, cold-upsetting, cutting, threading and the like, and by welding and brazing into desired articles of use.

Another object is the provision of an austenitic stainless steel which is resistant to corrosion by the combustion products of the leaded gasolines, as well as those of the standard gasolines and other fuels for internal combustion engines, all at high temperatures, temperatures up to 1800° F.; which steel is tough and strong both at high temperatures and at low temperatures; which steel when made into coiled springs is elastic at both high and low temperatures and resists relaxation; which steel is resistant to scaling at high temperatures; and which is adaptable to quick heating to very high temperatures, say up to 2000° F., from the sub-zero temperatures of wintertime and then quick cooling to the sub-zero temperatures, all without cracking or other failure.

A further object is the provision of various articles of ultimate use, more particularly smog burners of the catalytic or after-burner type for burning the uncombusted products of an internal combustion engine; exhaust mufflers with tightly coiled springs for dissipating the exhaust gases between coils, and controlling noise level, and electrodes of spark plugs for internal combustion engines, in all of which articles there are achieved resistance to scaling and corrosion under the many varying conditions of actual practical use along with long life and resistance to carbide-precipitation and intergranular attack and greatly improved resistance to corrosion and erosion by the wash and scour of hot gases.

Other objects of my invention in part will be apparent and in part more fully pointed to during the course of the following disclosure.

Accordingly, my invention will be seen to reside in the combination of elements, in the composition of ingredients, and in the relation between ingredients making up the novel steel of my invention, and in particular articles and products fashioned thereof, all as more particularly described herein and set forth in the claims at the end of this specification.

In order to gain a better understanding of certain features of my invention, it may be noted at this point that the corrosion-resisting steels and the heat-resisting steels are finding great favor in the art. In general, it may be said that the various corrosion-resisting and heat-resisting steels essentially contain chromium in the amount of some 10% to 30%, with remainder substantially all iron. Where desired, as in many of the grades of corrosion-resisting and heat-resisting stainless steels, there additionally is included nickel in amounts ranging from incidental percentages on up to about 30%. Manganese, while commonly present in incidental amounts, may range up to some 15%, this as a partial substitute for nickel. And silicon, which usually is present in incidental amounts, may be employed in amounts up to 3% or 4% for special purposes. Carbon is present in amounts anywhere from 0.02% to 1.5%. And many of the grades of both corrosion-resisting stainless and the heat-resisting steels contain special additions of molybdenum, tungsten, cobalt, copper, titanium, columbium and vanadium in small amounts.

More particularly, a [member] *number* of the more popular grades of corrosion-resisting and heat-resisting chromium-nickel stainless steels are the Type 304 (18% to 20% chromium, 8% to 12% nickel, remainder iron), the Type 309 (22% to 24% chromium, 12% to 15% nickel, 2% manganese, and remainder iron), the Type 310 (24% to 26% chromium, 19% to 22% nickel, 2% manganese, and remainder iron), the Type 316 (16% to 18% chromium, 10% to 14% nickel, 2.3% molybdenum, and remainder iron), the Type 321 (17% to 19% chromium, 8% to 11% nickel, 0.4% titanium, and remainder iron), and the Type 347 (17% to 19% chromium, 9% to 12% nickel, 0.8% columbium, and remainder iron).

While the many steels identified above are found to have excellent resistance to corrosion in various room temperature applications and even some elevated temperature applications, and, moreover, are generally found to work well in the mill both in hot-rolling from bloom or billet into plate, sheet, strip, bars, wire and other converted forms, and even work well in cold-rolling into sheet and strip and cold-drawing into wire, the high temperature mechanical properties of these steels and their resistance to corrosion and to scaling at high temperatures in the presence of many media leave much to be desired. Actually, it is found that all of these well known chromium-nickel stainless steels are inclined to corrosion and/or pitting or local attack when subjected to lead compounds at temperatures of 1150° F. and higher.

Of the various heat-resisting stainless steels—straight chromium grades—the Type 430 (14% to 18% chromium, .5% nickel, and remainder iron) and the Type 446 (23% to 27% chromium, .5% nickel, and remainder iron), the Type 430 is generally considered to possess good high temperature properties, and the Type 446 excellent high temperature properties, i.e., resistance to scaling at high temperatures and resistance to corrosive attack by many of the more common corrosive media. Actually, it is found that these two grades offer only fair resistance to the attack of various lead compounds at high temperatures. Unfortunately, however, these steels have limitations with respect to shaping and forming as by bending, pressing, cold-heading and other particular fabricating operations.

Accordingly, an object of the present invention is the provision of an alloy steel in which there is had a combination of good hot-working properties such as hot-rolling into sheet and strip or hot-rolling into bars and wire; good cold-working properties as in the production of cold-rolled sheet and strip and cold-drawn wire; good forming properties such as bending, pressing, cold-upsetting, cutting, threading, and the like; good welding and brazing characteristics; and good resistance to corrosive attack of various lead compounds, especially those encountered in the combustion products of the leaded fuels, that is, both completely combusted and incompletely combusted, all under the high temperature conditions obtaining in the engine and in the exhaust of the usual internal combustion engine, i.e., the engines of the usual automobile, truck, tractor, bus, lawnmower, boats, etc.

Referring now more particularly to the practice of my invention, I provide an alloy steel essentially consisting of the four ingredients manganese, chromium, nickel, nitrogen, with remainder substantially all iron. The amount of each of these several ingredents is substantial and is critical. Criticality also lies in the amount of carbon and silicon which may be tolerated. Each of these must be maintained at extremely low value, the carbon not exceeding .05% as a maximum and the silicon not exceeding .25% as a maximum, and preferably not exceeding .15%, although in those applications where corrosive attack by lead compounds is not involved the silicon cintent need not be so limited; the silicon content then may range up to 4.0% or more.

Each of the four essential ingredients manganese, chromium, nickel and nitrogen as well as the two ingredients carbon and silicon which must be tolerated, is critical, and so too, the relation between the same. For I find, as more particularly pointed out hereinafter, where the percentage figures and the relation between the same are consistently maintained, the desired results are achieved. Where, however, these percentage figures are substantially departed from, the desired results are not had.

Conveniently the steel of my invention is melted in an electric arc furnace in accordance with practices well known in the art. Following melting and finishing in the electric arc furnace, the metal is run into a suitable ladle for teeming. Ingots of desired size are had which, when stripped from the molds, are reheated and converted into slabs, blooms and billets for further conversion as by hot-rolling into plate, sheet, strip, bars, wire, and the like. And where desired, further conversion into cold-rolled sheet and strip and cold-drawn wire. The metal works well in the hot mill and in the cold mill, as well.

Considering now more particularly the composition of the alloy steel of my invention, I provide a stainless steel consisting essentially of about: .05% max. carbon, 8% to 16% manganese, .25% max. silicon, 19.5% to 23.0% chromium, 5.5% to 9.5% nickel, .20% to .40% nitrogen, molybdenum up to 4.0%, and remainder substantially all iron. The phosphorus and sulphur contents of my steel are each limited to about .04% max.

In broadest aspect, however, the steel of my invention consists essentially of about: .05% max. carbon, 8% to 16% manganese, phosphorus and sulphur each up to .04% max., 17.0% to 23.0% chromium, 5.5% to 9.5% nickel, .20% to .40% nitrogen, molybdenum up to 4.0%, and remainder substantially all iron. Silicon may be present in amounts up to 4.0% or more.

A preferred steel in accordance with the teachings of my invention essentially consists of about: .05% max. carbon, 8.0% to 10.0% manganese, .25% max. silicon, 19.5% to 21.0% chromium, 6.00% to 7.00% nickel, .22% to .30% nitrogen, and remainder substantially all iron. As a specific preference, the silicon content is maintained at a value not exceeding .15%.

A further preferred steel, according to my invention, essentially consists of about: .05% max. carbon, 8.0% to 10.0% manganese, .25% max. silicon, 17.0% to 18.5% chromium, 6.00% to 7.00% nickel, .22% to .30% nitrogen, 2.0% to 2.5% molybdenum, and remainder substantially all iron. Here again, the silicon content of the steel is preferably maintained at a value not exceeding .15%.

The steel of my invention is austenitic and substantially free of delta-ferrite in the annealed and cold-worked conditions. Moreover, the austenite is fully retained throughout cold-working and cold-forming, there is some hardenisg effect in the usual fabricating operations such as shaping, bending, stretching, shrinking, upsetting, cutting, trimming, threading or the like, in the fashioning of sheet and strip material. Also, with cold reductions, as in the cold-drawing of wire and tightly coiling, some hardening is had which is further developed by hardening heat-treatment, i.e., heating the coiled wire at a temperature of some 800° to 1000° F.

In the steel of my invention the composition is in every sense critical. A low carbon content, that is, a carbon content not exceeding .05% max., is necessary because I find that with a significantly higher carbon content the steel contains too many precipitated carbides and is more difficult to process, by hot-working. Moreover, with the higher carbon content the steel suffers in cold-workability as in the production of cold-rolled sheet and strip and in the production of cold-drawn wire. With the carbon content not exceeding .05% I find there is sufficient ductility in the sheet and strip to permit the fashioning of tubing and forming into various other shapes as by pressing, bending, cold-upsetting and the like. Moreover, the very low carbon content assures effective welding and brazing without the deteriorating effects of carbide precipitation within the heat affected zones. The very low carbon content also contributes to the excellent corrosion-resistance of my steel, partially as a result of freedom from carbide precipitation at elevated temperatures wherein the steel would be partially robbed of chromium, with consequent loss of corrosion-resistance at room temperatures and elevated temperatures, as well.

Similarly, the manganese content of my steel is critical. Manganese is necessary in order to achieve the desired resistasce to lead oxide. Also it serves as an excellent vehicle for the high nitrogen content of my steel, the nitrogen being introduced as nitrided electrolytic manganese, as noted above. With a manganese content of less than about 8%, there is a possibility of developing porosity in the as-cast material because of lowered solubility for nitrogen. And there are practical and economic reasons for not wanting the manganese to exceed 16%; manganese in excess of 16% does not result in any gain in useful properties and it is expensive to add because of high melting losses. Furthermore, the corrosion resistance of the steel suffers adversely with an excess of manganese, especially in the presence of strong reducing acids.

A low silicon content is required since I find that silicon adversely affects the resistance of the steel to the corrosive attack of the various lead compounds found in the combustion products of the leaded gasolines. In general, the silicon content should not exceed .25% as a maximum and preferably should not exceed .15%, as noted above.

Where the corrosive attack of lead compounds such as the combustion products of leaded fuels, is not involved, however, there is no necessity for restricting the silicon content to the critically low figure of .25% max. The silicon content then may amount to as much as 4.0% or more, as noted above.

The chromium content of the steel is critical; a chromium content lower than about 19.5% results in the loss of the ability to withstand scaling at high temperatures. And where the chromium content exceeds about 23.0%, increased difficulty arises in maintaining austenite stability, and as a result, hot-working difficulties are encountered.

The nickel content is important and critical. I find that at least 5.5% nickel is necessary to achieve the desired fully austenitic structure. And I find that a nickel content in excess of about 9.5% unduly adds to the cost of the metal. Moreover, it unduly stiffens the matrix of the steel, restricts its solubility for carbon, increases the possibility for objectionable carbide precipitation, and decreases the resistance of the steel to attack by lead oxide and other lead compounds.

In my steel best results are had where the sum of the manganese and nickel contents substantially exceeds 14%. With any substantially lesser amount of manganese and nickel, in total, there is an inclination toward the formation of ferrite with a consequent loss of the fully austenitic structure of the metal and a loss of hot-workability.

The nitrogen content, too, is critical; it contributes to the austenitic structure of the metal, increases the yield strength at all temperatures and assures high temperature strength. With a nitrogen content less than about .20% there is a loss of austenite, also a loss of strength and hardness. With a nitrogen content exceeding about .40%, the steel becomes much too stiff at hot-rolling temperatures and prevents effective and consistent rolling to the desired thin gauges.

Molybdenum, as noted above, is not an essential ingredient of my steel. Certain advantages, however, are gained by way of a molybdenum addition up to 4.0%. It improves the hot-rolling characteristics of the steel. Moreover, it improves the high temperatures strength of the metal. Additionally, it improves the resistance to lead oxybromide. Moreover, it improves the corrosion-resistance of the metal to reducing acids both at room temperatures and at sub-zero temperatures. An excessive amount of molybdenum, however, adversely affects the scaling resistance of the steel in that it requires a lowering of the chromium content to preserve the austenite balance and with the lowering of chromium, the scaling resistance at high temperatures definitely suffers.

The steel of my invention in the form of plate, sheet, strip, bars, rods and wire is supplied various customer fabricators, the steel usually being in the annealed condition, annealed at the mill at a temperature of some 1700° to 2000° F. and quenched in air, oil or water. Where desired, however, it will be understood that the metal may be supplied in the hot-rolled condition. Customarily, however, the metal is supplied in the form of cold-rolled sheet and strip and cold-drawn wire. The metal is soft, ductile and readily lends itself to a host of forming operations such as pressing, bending, upsetting, cutting, drilling, threading or other machining. And readily may be welded or brazed as in the production of particular articles of ultimate use.

The marked superiority of the readily formable austenitic stainless steel of my invention for high temperature applications in the presence of the combustion products of the leaded fuels, this as compared with the known easily formable stainless steels and other alloys of the prior art, is well pointed up by the comparative test data presented in Table I below:

TABLE I.—RESULTS OF HIGH TEMPERATURE CORROSION TESTS ON VARIOUS ALLOYS*

| Alloy | Percent Cr | Percent Ni | Other | Wt. Loss per sq. in. in grams | Remarks |
|---|---|---|---|---|---|
| Inconel | 16 | 75 | | .720 | Very severe corrosion. |
| Incoloy | 21 | 33 | | .228 | Severe Pitting. |
| Do | 21 | 33 | | .287 | Do. |
| Do | 21 | 33 | | .275 | Do. |
| Type 304 | 18–20 | 8–12 | | .717 | Very severe corrosion. |
| Do | 18–20 | 8–12 | | .788 | Do. |
| Do | 18–20 | 8–12 | | .821 | Do. |
| Type 309 | 22–24 | 12–15 | Mn 2.0 | .907 | Severe local attack. |
| Type 310 | 24–26 | 19–22 | Mn 2.0 | .927 | Do. |
| Type 316 | 16–18 | 10–14 | Mo 2.3 | .795 | Do. |
| Type 321 | 17–19 | 8–11 | Ti 0.4 | .216 | Moderate corrosion. |
| Do | 17–19 | 8–11 | Ti 0.4 | .242 | Do. |
| Do | 17–19 | 8–11 | Ti 0.4 | .367 | Do. |
| Type 347 | 17–19 | 9–12 | Cb 0.8 | .502 | Severe corrosion. |
| Type 430 | 14–18 | 0.5 | | .176 | Good. |
| Do | 14–18 | 0.5 | | .176 | Do. |
| Do | 14–18 | 0.5 | | .172 | Do. |
| Invention | 21 | 6 | Mn 9 | .086 | Very good. |

* Corrosion tests at 1,800° F. in a composite corrosive mixture consisting of 5 parts lead oxide by weight, 5 parts lead sulphate, 3 parts lead chloride, 2 parts lead bromide, and 1 part sulphur.

The favorable mechanical properties of my steel are given in Tables II and III below. In Table II the composition of two of my steels is given, this along with the composition of two of the steels of the prior art which is of no immediate moment.

TABLE II.—CHEMICAL COMPOSITION OF FOUR HIGH TEMPERATURE ALLOY STEELS

| Grade | Heat No. | C | Mn | Si | Cr | Ni | | Mo |
|---|---|---|---|---|---|---|---|---|
| Invention | R2658 | .049 | 8.64 | .23 | 20.76 | 6.19 | .32 | |
| Invention | R2659 | .038 | 8.39 | .17 | 17.66 | 6.15 | .29 | 2.24 |
| Prior Art | R2802 | .061 | 8.75 | .14 | 17.87 | 5.18 | .20 | |
| Prior Art | 83405 | .092 | 1.12 | .26 | 24.46 | .92 | | |

The mechanical properties of the two steels of my invention in the form of strip of about .018″ thickness and in the annealed condition are given in Table III below:

TABLE III.—MECHANICAL PROPERTIES OF THE TWO STEELS OF THE PRESENT INVENTION GIVEN IN TABLE II, THESE IN THE ANNEALED CONDITION

| Heat No. | Tensile Str. p.s.i. | 0.2% Y.S., p.s.i. | Percent El. in 2″ | Hardness Rb |
|---|---|---|---|---|
| R2658 | 124,800 | 72,100 | 48 | 84.0 |
| R2659 | 125,000 | 72,100 | 48 | 81.0 |

A comparison of the corrosion-resisting characteristics of my steel and two of the best steels of the prior art at several high temperatures, namely 1550° F., 1800° F. and 2000° F., is given below in Table IV and a comparison of the resistance to corrosion by lead oxybromide is given in Table V.

TABLE IV.—RESULTS OF LEAD CORROSION TESTS ON THE FOUR STEELS OF TABLE II*

| Material | Thickness, inches | Test Temp., ° F. | Loss per Sq. In. in Grams |
|---|---|---|---|
| R2658 | .045 | 1,550 | 0.070 |
| R2659 | .014 | 1,550 | 0.079 |
| R2902 | .051 | 1,550 | 0.054 |
| Type 446 | .069 | 1,550 | 0.074 |
| R2658 | .045 | 1,800 | 0.087 |
| R2659 | .014 | *1,800* [9,800] | 0.154 |
| R2802 | .051 | 1,800 | 0.261 |
| Type 446 | .068 | 1,800 | 0.173 |
| R2658 | .045 | 2,000 | 0.307 |
| R2659 | .014 | 2,000 | 0.365 |
| R2802 | .051 | 2,000 | 0.577 |
| Type 446 | .068 | 2,000 | 0.367 |

*Corrosion tests in 5 parts oxide by weight, 5 parts lead sulphate, 3 parts lead chloride, 2 parts lead bromide, 1 part sulphur.

The comparative weight loss of the four sample steels in lead oxybromide with exposure for 1 hour at 1550° F. is given in Table V:

TABLE V

| Material | Thickness, inches | Test Temp., ° F. | Loss per Sq. In. in Grams |
|---|---|---|---|
| R2658 | .045 | 1,550 | 0.679 |
| R2659 | .014 | 1,550 | 0.515 |
| R2802 | .051 | 1,550 | 1.13 |
| Type 446 | .068 | 1,550 | 1.48 |

The resistance of my steel to scaling at high temperatures, this with intermittent cyclic heating and cooling, as compared to the best heat-resisting steels of the prior art, is given in the following Table VI:

TABLE VI.—RESULTS OF SCALING TESTS OF THE FOUR STEELS OF TSBLE II

| Material | Thickness, Inches | Temperature and Time | Loss per Sq. In. in Grams | Loss IPY |
|---|---|---|---|---|
| R2658 | .045 | 1,700° F.—5-1 hr. cycles | 0.0232 | 0.320 |
| R2659 | .014 | 1,700° F.—5-1 hr. cycles | 0.0446 | 0.615 |
| R2802 | .051 | 1,700° F.—5-1 hr. cycles | 0.0217 | 0.300 |
| Type 446 | .068 | 1,700° F.—5-1 hr. cycles | 0.0300 | 0.430 |

The superiority of the steels of my invention in matters of resistance to corrosion at various high temperatures by a combination of lead compounds and by lead oxybromide, and in matters of scaling resistance under conditions of intermittent and cyclic heating at high temperatures readily is apparent from the results presented in Tables IV, V and VI above. Thus, for example, at a temperature of 2000° F. and in the presence of a mixture of lead compounds as noted in Table IV, the specific steels of my invention suffer weight losses of 0.307 and 0.365 gram per square inch, while the two best steels of the prior art suffered losses of 0.577 and 0.367 gram per square inch. With lead oxybromide and at a temperature of 1555° F., as noted in Table V, the comparison is even more pronounced; the weight losses of the two specific steels of my invention amount to only one-half of that suffered by the two best steels of the prior art. While all four of the steels showed reasonably good resistance to scaling with cyclic heating at 1700° F., it is noted from Table VI that the specific example of my steel of the higher chromium content (and free of molybedenum) revealed a resistance to scaling much superior to the example of the lower chromium content which does contain molybdeum.

The steel of my invention is the form of cold-rolled strip, as noted above, is particularly suited to the production of various parts of an anti-smog device whether combustion chamber, heat chamber, after burner or other components for handling the exhaust gases of various internal combustion engines, notably passenger vehicles, trucks, tractors, buses, and the like. The cold-rolled sheet or strip effectively lends itself to fabrication into a liner for the combustion chamber of the after-burner. Also it readily may be formed into the required manifold shell. Applicant fiinds that the steel well resists the corrosive attack of the various combustion products of the leaded fuels and other fuels at high operating temperatures encountered in actual use. The heat exchanger of the anti-smok device in which the essential parts in contact with the exhause gases are fashioned of the steel of my invention is intended to last the life of passenger vehicle, truck, tractor, bus or other vehicle upon which it is installed. With the after-burner employing the essential elements fashioned of the steel of the present invention the conventional muffler may be dispensed with.

My new steel in the form of cold-drawn wire lends itself readily to the production of a tightly coiled helical spring of substantial diameter and length employed as the effective operational part of an exhaust muffler for an internal combustion engine. Illustratively, the wire, cold-drawn to a reduction in area of about 30%, is suitably fashioned into a helical spring of desired length and diameter, following which it is age-hardened by heating at a temperature of some 800° to 1300° F. and air cooling. The elestic quality of the steel at high temperatures and in the presence of the combustion products of the leaded gasolines and other fuels assures effective operation of the helical spring, with pressure of the exhaust gases expanding the spring to permit egress into the atmosphere, all without sag or relaxation over prolonged periods of use. The spring is well calculated to last the life of the vehicle on which the muffler is installed.

The relaxation properties of cold-drawn and age-hardened steel wire according to my invention (two different cold-reductions and three different hardening temperatures for each) is given below in Table VII, this under a load of about 40,000 p.s.i. and at a temperature of about 850° F. for a period of 5 days' time.

TABLE VII.—RELAXATION PROPERTIES OF STEEL WIRE OF THE PRESENT INVENTION*

[R.T. stress 40,000 p.s.i.—temp. 850° F.—time 5 days—wire size .125'' diameter]

| Condition: | Relaxation Percent Loss in Load |
|---|---|
| 15% CD+1000° F.—2 Hrs. A.C. | 10.2 |
| 15% CD+1150° F.—2 Hrs. A.C. | 10.0 |
| 15% CD+1300° F.—2 Hrs. A.C. | 6.8 |
| 30% CD+1000° F.—2 Hrs. A.C. | 9.1 |
| 30% CD+1150° F.—2 Hrs. A.C. | 6.0 |
| 30% CD+1300° F.—2 Hrs. A.C. | 7.3 |

*Heat 50380 analyzing .039% carbon, 9.26% manganese, .12% silicon, 20.14% chromium, 6.27% nickel, .28% nitrogen, and remainder substantially all iron.

The mechanical properties of the cold-drawn wire of my invention (age-hardened at three different temperatures following cold-reduction) are given in Table VIII, this for wire of about 0.125° diameter.

TABLE VIII.—MECHANICAL PROPERTIES OF THE STEEL WIRE* OF THE PRESENT INVENTION

| Condition | U.T.S., p.s.i. | .2% Y.S. p.s.i. | Percent El. | Percent R.A. | Rock. Hard. |
|---|---|---|---|---|---|
| 15% CD+1,000° F.—2 Hrs. A.C | 128/128,000 | 101/103,000 | 56/56 | 68/68 | C21 |
| 15% CD+1,150° F.—2 Hrs. A.C | 123/127,000 | 89/ 97,000 | 44/46 | 67/67 | C20 |
| 15% CD+1,300° F.—2 Hrs. A.C | 120/125,000 | 93/ 93,000 | 60/60 | 65/65 | C20 |
| 30% CD+1,000° F.—2 Hrs. A.C | 179,000 | 162,000 | 28 | 57 | C39 |
| 30% CD+1,150° F.—2 Hrs. A.C | 166/166,000 | 148/150,000 | 28/28 | 52/56 | C33 |
| 30% CD+1,300° F.—2 Hrs. A.C | 159/159,000 | 140/141,000 | 40/40 | 56/59 | C30 |

* Heat 50380 whose chemical analysis is given as a footnote to Table VII.

From the data given in Tables VII and VIII it rather clearly appears that the best combination of mechanical properties and relaxation properties are had with a cold reduction of about 30% followed by ageing at a temperature of about 1150° F. for two hours. Note that with this treatment there is had an ultimate tensile strength of 166,000 p.s.i. and a yield strength of 148,000 p.s.i. with a relaxation loss in load of only 6.8%. This same low relaxation loss is had in wire of 15% cold-reduction but the ultimate and yield strengths there only come to about 123,000 and 89,000 p.s.i., respectively.

In addition to the production of an anti-smog device and the helical spring component of an internal combustion engine muffler, my steel is well suited to the production of the electrodes employed in the spark plug for an internal combustion engine. In this application both the center electrode of the plug and the outside electrode are fashioned of the steel wire of my invention. The metal readily lends itself to welding by conventional methods, permitting a secure weld between the outside electrode and the metal shell of the plug. The thermal conductivity of the electrodes is adequate and the electrodes resist the wash, scour and corrosive attack of the internal combustion engine gases. Moreover, the electrodes present good resistance to erosion by electric spark. Resistance to oxidation is good at the temperatures encountered in actual use, temperatures ranging up to 1800° F.

In the steel of my invention and in the various articles fabricated thereof there is achieved excellent resistance to the corrosive attack of various lead compounds at high temperatures, all as encountered in the exhaust gases of internal combustion engines, particularly the combustion products of the leaded fuels. The steel is resistant to oxidation and scaling at high temperatures. And whether in the form of sheet or strip or in the form of cold-drawn wire it adequately resists corrosion, scaling under the wash and scour of the hot exhaust gases of the internal combustion engine whether completely or incompletely burned. And in the form of cold-drawn and age-hardened wire there is achieved not only good resistance to corrosion by the exhaust gases and resistance to scaling, but excellent mechanical properties, as well, particularly the properties of elasticity and relaxation.

Thus it will be seen that I provide in my invention a ductile and readily formable manganese-chromium-nickel-nitrogen austenitic stainless steel of critically low carbon and silicon contents in which the many objects hereinbefore set forth together with many practical advantages are successfully achieved. Moreover, it will be seen that I provide stainless steel sheet and strip, possesing a combination of corrosion-resisting and scale-resisting properties along with excellent formability and good welding and brazing characteristics. The brazed or welded products are free of carbide precipitation difficulties within the heat affected areas. I also provide cold-drawn stainless steel wire of high quality as noted above. The steel of my invention, whether in the form of plate, sheet, strip, bars, rods, wire, and the like, readily lends itself to fabrication into a host of articles of ultimate use, in which articles there are enjoyed the combination of ductility and good formability, along with strength and toughness at elevated temperatures and excellent resistance to scaling and corrosion by the combustion products of the leaded fuels and other fuels employed in the internal combustion engine.

While all of the beneficial properties characterizing my steel are had only where the silicon content is restricted to the critically low figure of .25% max., the beneficial working, forming, welding, brazing and age-hardening properties, with resultant strength and toughness, in fact all benefits excepting resistance to the corrosive attack by lead compounds, are achieved when the silicon content is not restricted to .25% max.

Since many embodiments may be made of my invention and since many variations may be made in the several embodiments hereinbefore set forth, it will be understood that all matter described herein is to be interpreted as illustrative and not as a limitation.

Having described my invention, I claim:

[1. An alloy steel having good hot-rolling, good cold-forming, good welding and good scaling resistance properties, said steel essentially consisting of about: 8% to 16% manganese, 17.0% to 23.0% chromium, 5.5% to 9.5% nickel, .20% to .40% nitrogen, carbon not exceeding .05%, silicon up to 4.0% or more, and remainder essentially iron.]

[2. An alloy steel having good hot-rolling, good cold-forming, good welding and good scaling resistance properties, said steel essentially consisting of about: 8% to 16% manganese, 19.5% to 23.0% chromium, 5.5% to 9.5% nickel, .20% to .40% nitrogen, carbon not exceeding .05%, silicon up to 4.0%, and remainder essentially iron.]

3. An alloy steel having good hot-rolling, good cold-forming and good welding properties said steel *being fully austenitic and substantially free of delta-ferrite in the annealed and cold-worked conditions and* essentially consisting of about: 8.0% to 10.0% manganese, 20.0% to 21.0% chromium, 6.25% to 6.75% nickel, .22% to .30% nitrogen, carbon not exceeding .05%, and remainder essentially iron.

4. An alloy steel having good hot-rolling, good cold-forming and good welding properties said steel *being fully austenitic and substantially free of delta-ferrite in the annealed and cold-worked conditions and* essentially consisting of about: 8.0% to 10.0% manganese, 20.0% to 21.0% chromium, 6.25% to 6.75% nickel, 22% to .30% nitrogen, carbon not exceeding .05%, and remainder essentially iron.

5. An alloy steel having good hot-rolling, good cold-forming and good welding properties, and good corrosion-resistance and scaling resistance, said steel *being fully austenitic and substantially free of delta-ferrite in the annealed and cold-worked conditions and* essentially consisting of about: 8% to 16% manganese, 19.5% to 23.0% chromium, 6.0% to 9.5% nickel, .20% to .40% nitrogen, carbon not exceeding .05%, silicon not exceeding .25%, and the remainder essentially iron.

6. An alloy steel having good hot-rolling, good cold-forming and good welding properties, and good corrosion-resistance and scaling resistance said steel *being fully austenitic and substantially free of delta-ferrite in the annealed and cold-worked conditions and* essentially consisting of about: 8.0% to 10.0% manganese, 19.5% to 21.0% chromium, 6.0% to 7.00% nickel, .22% to .30% nitrogen, carbon not exceeding .05%, silicon not exceeding .25%, and remainder essentially iron.

7. An alloy steel having good hot-rolling, good cold-forming and good welding properties, and good corrosion-resistance, said steel *being fully austenitic and substantially free of delta-ferrite in the annealed and cold-worked conditions and* essentially consisting of about: 8.0% to 10.0% manganese, 20.0% to 21.0% chromium, 6.25% to 6.75% nickel, .22% to .30% nitrogen, carbon, not exceeding .05%, silicon not exceeding .25%, and remainder essentially iron.

8. *Alloy* [Hot-rolled alloy] steel *plate,* sheet and strip of good cold-forming and good welding properties, and of good corrosion-resistance and scaling resistance, *which is fully austenitic and substantially free of delta-ferrite in the annealed and cold-worked conditions,* and essentially consisting of [about:] 8% to [16%] *10%* manganese, 19.5% to [23.0%] *about 21%* chromium, [5.5%] *6.0%* to [9.5%] *about 7%* nickel, [.20% to .40%] *.2% to about .3%* nitrogen, carbon not exceeding .05%, and remainder essentially iron.

9. [Cold-rolled] *Fully austenitic cold-rolled* alloy steel sheet and strip *free of delta-ferrite and* having good cold-forming and good welding properties, and good corrosion-resistance, and essentially consisting of about: 8.0% to 10.0% manganese, 20.0% to 21.0% chromium, 6.25% to 6.75% nickel, .22% to .30% nitrogen, carbon not exceeding .05%, silicon not exceeding .25%, and remainder essentially iron.

10. Alloy steel *billet, bar, rod and* wire having good cold-forming and good welding properties, and good corrosion-resistance and scaling resistance, *which is fully austenitic and substantially free of delta-ferrite in the annealed and cold-worked conditions,* and essentially consisting of [about:] 8% to [16%] *about 10%* manganese, 19.5% to [23.0%] *about 21%* chromium, [5.5%] *6%* to [9.5%] *about 7%* nickel, [.20% to .40%] *.2% to about .3%* nitrogen, carbon not exceeding .05%, and remainder essentially iron.

11. [Cold-drawn] *Fully austenitic cold-drawn* alloy steel wire *substantially free of delta-ferrite and* having good cold-forming and low relaxation properties and essentially consisting of about: 8.0% to 10.0% manganese, 19.5% to 21.0% chromium, 6.00% to 7.00% nickel, .22% to .30% nitrogen, carbon not exceeding .05%, silicon not exceeding .25%, and remainder essentially iron.

[12. In a device for burning the incompletely combusted exhaust gases of an internal combustion engine, a welded alloy steel sheet metal housing essentially consisting of about: 8% to 16% manganese, 19.5% to 23.0% chromium, 5.5% to 9.5% nickel, .20% to .40% nitrogen, carbon not exceeding .05%, silicon not exceeding .25%, and remainder essentially iron.]

[13. In a muffler for internal combustion engine exhaust gases, a tightly coiled alloy steel wire spring having low relaxation properties and essentially consisting of about: 8% to 16% manganese, 19.5% to 23.0% chromium, 5.5% to 9.5% nickel, .20% to .40% nitrogen, carbon not exceeding .05%, silicon not exceeding .25%, and remainder essentially iron.]

References Cited

The following references, cited by the Examiner, are of record in the patented file of this patent or the original patent.

UNITED STATES PATENTS

| | | |
|---|---|---|
| 2,820,725 | 1/1958 | Wasserman. |
| 2,894,833 | 7/1959 | Linnert. |
| 3,311,511 | 3/1967 | Goller. |
| 3,171,738 | 3/1965 | Renshaw et al. -------- 75—128 |

OTHER REFERENCES

Renshaw et al.: "The Corrosion Properties of Chromium-Nickel-Manganese Austenitic Stainless Steels," Proceedings, American Society for Testing Materials, vol. 56, 1956, p. 867.

HYLAND BIZOT, Primary Examiner

UNITED STATES PATENT OFFICE

CERTIFICATE OF CORRECTION

Reissue No. 26,903 June 9, 1970

Paul A. Jennings

It is certified that error appears in the above identified patent and that said Letters Patent are hereby corrected as shown below:

Column 10, line 45, "properties" should read -- properties, --; lines 48 and 49, "20.0% to 21.0%" should read -- 19.5% to 21.0% --; line 49, "6.25% to 6.75%" should read -- 6.00% to 7.00% --; line 53, "properties" should read -- properties, --; lines 57 and 58, "22% to .30%" should read -- .22% to .30% --; line 66, "6.0% to 9.5%" should read -- [5.5%] 6.0% to 9.5% --.

Signed and sealed this 10th day of November 1970.

(SEAL)
Attest:

Edward M. Fletcher, Jr.
Attesting Officer

WILLIAM E. SCHUYLER, JR.
Commissioner of Patents